United States Patent Office 3,654,211
Patented Apr. 4, 1972

3,654,211
ALKYLENE BIS-DIALKYL AROMATIC TRICARBOXYLATE PLASTICIZERS
John Thomas Lutz, Jr., Cornwells Heights, Pa., assignor to Rohm and Haas Company, Philadelphia, Pa.
No Drawing. Filed Apr. 7, 1970, Ser. No. 26,395
Int. Cl. C08f 45/36
U.S. Cl. 260—31.6            18 Claims

ABSTRACT OF THE DISCLOSURE

Plasticizing of vinyl chloride polymers with tricarboxylic acid esters having the formula:

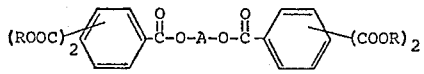

where R is an alkyl hydrocarbon having 4 to 13 carbon atoms, and A is the residue of an alkylene or alicyclic glycol having 2 to 10 carbon atoms or of a polyalkylene ether glycol having 4 to 8 carbon atoms. The esters are produced by the esterification of an aromatic tricarboxylic acid or acid anhydride with one of the above glycols and then with an alcohol, or with the glycol and alcohol at the same time.

---

The present invention is directed to plasticized vinyl chloride polymers. More specifically, the invention is directed to plasticized vinyl chloride polymers containing alkylene bis-dialkyl aromatic tricarboxylic acid esters having the formula:

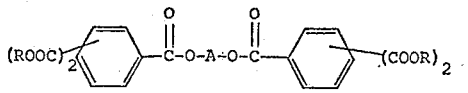

where R is an alkyl group, and A the residue of an alkyl or alicyclic glycol or a polyalkylene ether glycol.

Monomeric and polyester plasticizers for vinyl chloride polymers have been widely used to provide flexible and semi-flexible films and articles. The monomeric plasticizers are generally of low viscosity and useful to provide easily processed compositions. However, the monomeric plasticizers generally are easily extracted from the polymer composition when contacted with soapy water, hydrocarbons, or other plastics, and volatilize readily when exposed to heat. To alleviate this, higher molecular weight, esters of trimellitic anhydride, such as trioctyl trimellitate (TOTM) have been utilized for their good resistance to loss due to volatility or extraction by contact with soapy water. However, like other monomeric plasticizers, they are quite extractable by hydrocarbons and migrate easily into other plastic materials.

The polyester plasticizers of the prior art overcome the problem of extraction that occurred when monomeric plasticizers were utilized, but due to their high viscosity, processing of compositions containing such polyesters is difficult. Further, polyester plasticizers often hydrolyze when exposed to water, thus losing their electrical insulating properties.

Attempts have been made to utilize relatively high molecular weight aromatic bis-esters of trimellitic anhydride as disclosed in British Pat. 1,012,003 to solve these problems. However, such materials are not useful as plasticizers for vinyl chloride polymers since they yield very hard-brittle products even when utilized in concentrations as high as 67 parts per 100 of resin. In addition, the aromatic bis-esters readily attack polymers such as polystyrene.

Therefore, the present invention is directed to plasticizers which overcome the difficulties inherent in those of the prior art. That is, the plasticizers of the present invention have excellent resistance to loss through extraction by hydrocarbons, excellent electrical resistance, and do not migrate readily into other polymers such as rubber and polystyrene. Further, these plasticizers are of a relatively low viscosity, and thus are more easily processed into flexible and semi-flexible films than are the prior art polyester plasticizers.

The alkylene bis-dialkyl trimellitate esters of the present invention provide, for the first time, monomeric plasticizers for vinyl chloride polymers, having the above advantages which are useful in pressure sensitive tapes and foils, refrigerator and other gaskets, foams which come into contact with plastics and plastic coatings. Further, the plasticizers of the present invention may be utilized in hydrocarbon resistant sheeting articles and electrical insulation having superior insulating properties. When the present plasticizers are used in electrical insulating compositions, the resultant material retains its insulating characteristics upon exposure to water, and is resistant to hydrocarbons.

When the bis esters of the present invention are utilized in pressure sensitive tapes or foils, they are incorporated in the backing material and result in a pliable, easily utilized product. In this case, the polymer and plasticizer are usually combined with lubricants, stabilizers, fillers, and, if desired, other plasticizers.

Further, the plasticizers may be used in non-marring gasket compositions where a vinyl chloride polymer is mixed with conventional materials and plasticized with a bis-ester of the present invention to yield an excellent gasket which has good sealing and insulation characteristics in uses such as refrigerators, as well as being non-marring in nature. These plasticizers may also be used in non-marring foams when substituted for all or part of a conventional plasticizer in the foamable vinyl chloride compositions to yield a product of good non-marring characteristics.

The present plasticizers, when used with vinyl chloride polymers in such applications as automobile interiors, resist window fogging. When conventional plasticizing agents are utilized, the fogging is often severe and can be visually observed on a glass test piece; however, with the bis-esters of the present invention, the fogging is not visible under equivalent conditions.

The plasticizers of the present invention are alkylene bis-dialkyl trimellitic acid esters having the following general formula:

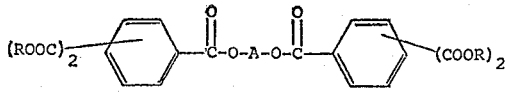

where R is an alkyl group, i.e. the residue of a linear or branched chain alcohol, having from about 4 to 13, preferably about 6 to 10 carbon atoms, and A is the residue of an alkylene or alicyclic glycol having from about 2 to 10, preferably about 2 to 5 carbon atoms or of a polyalkylene ether glycol of about 4 to 8, preferably about 4 to 6 carbon atoms. In the present invention, the words alkyl and/or alkylene mean a linear or branched chain hydrocarbon group or groups of the specified length. Additionally, R and/or A may contain such nondeleterious substituents as those commonly found in commercial grade glycols and alcohols. In the preferred embodiment of the present invention, the glycol residue linkage is next adjacent to at least one of the alcohol residue ester groups, that is, at least two different ester groups are bonded to adjacent carbon atoms on the aromatic nucleus.

These esters may be utilized as plasticizers in thermoplastic compositions of vinyl chlorides which are the polymers and copolymers of vinyl chloride widely utilized in the production of plastic articles. Although referred to as vinyl chloride polymers in the present invention, for most all uses they are modified, compounded or copolymerized with other materials to provide processable and useful compositions. For the purpose and scope of this specification the term "vinyl chloride polymers" or "vinyl chloride polymer compositions" will include all compositions which have vinyl chloride as the major (greater than 50%) component or starting material. The compositions include, but are not limited to: poly(vinyl chloride) [PVC], copolymers of vinyl chloride with other monomers that include vinyl alkanoates such as vinyl acetate and the like, vinylidene halides such as vinylidene chloride, alkyl esters of unsaturated carboxylic acids such as acrylic acid like ethyl acrylate, 2-ethylhexyl acrylate and the like, unsaturated hydrocarbons such as ethylene, propylene, isobutylene and the like, allyl compounds such as allyl acetate and the like; and modified versions of the above polymers for impact strength. Exemplary modifiers are impact modifiers such as acrylic elastomers, butadiene copolymers, and the like; processing modifiers, for example, for improving rolling banks, such as acrylic polymers of alkyl methacrylates or acrylates; flexibility modifiers such as plasticizers other than those of the present invention such as dioctyl phthalate, poly(propylene adipate) and the like; and other modifiers such as halogenated olefins. The molecular weight and molecular weight distribution of the polymers in the compositions of the present invention are not critical to the aims, purposes and results thereof. For general applications, however, vinyl chloride polymers with Fikentscher K-values in the range of 40 to 95 are generally used. The Fikentscher K-value is determined by the formula $$\frac{\log \eta_{rel}}{C} = \frac{75 \times 10^{-6} K^2}{1 + 1.5 \times 10^{-3} KC} + 10^{-3} K$$

where

C is a constant concentration of polymer in solvent equaling 0.5 gm./100 ml,
$\eta_{rel}$ is relative viscosity in cyclohexanone at 25° C. and
K is Fikentscher Value.

When copolymers of vinyl chloride are utilized in the practice of the present invention, it is usually preferable to utilize a polymer containing from 0 to 15 weight percent comonomer residues. This comonomer is preferably the vinyl alkanoate, and is most preferable vinyl acetate. The most preferable copolymer contains up to 10 weight percent of the comonomer, the remainder being vinyl chloride. It should be noted that when copolymers are utilized in the present invention, less plasticizer may be required. The copolymer of vinyl chloride and another monomer, mentioned above, are often softer than of vinyl chloride.

The above copolymers vary in physical characteristics such as viscosity and molecular weight. The copolymers generally are of slightly lower molecular weights than PVC. Also, the viscosity values are often slightly lower, although generally within the above range. These differences however, are not limiting in the present invention which is directed to plasticizing such polymers and not the polymers themselves. The polymers, however, as is obvious, must be suitable for the use desired when plasticized, and physically must be of a type that the present plasticizers can be added thereto.

Finally, the most preferred polymer, and the polymer which is most effectively plasticized by the bis-ester of the present invention is the homopolymer of vinyl chloride. The plasticizers may be utilized in the presence of other plasticizers such as alkyl phthalates, stabilizers such as barium-cadmium complexes, lubricants such as stearic acid, fillers such as calcium carbonate, pigments such as titania, foaming agents such as azo bisformamide or any other ingredient common to the art of formulating, processing and fabricating thermoplastic materials. In particular, carbon black is often added to the plasticized compositions of the present invention when a pressure sensitive tape is prepared. Under these circumstances, the amount of carbon black varies widely, dependent upon the use of the amount and particular carbon black used, however, is usually present in an amount of from about 0.5 to 10, preferably about 1 to 5 weight percent, based on the vinyl chloride polymer.

Further, other materials such as other plasticizers, stabilizers, lubricants, etc. can be used. Exemplary materials are ditridecyl phthalate, dibasic lead phthalate and paraffin, respectively.

In the present invention, the thermoplastic polymers are plasticized by the addition of an effective amount of the bis-esters of the present invention. The amount of plasticizer depends on the article to be produced, but is often from about 1 to about 600 parts per 100 parts of resin (p.h.r.), usually about 20 to 100 p.h.r. As noted above, the amount of plasticizer varies with the use of the resultant material, as well as the process by which the polymers are formed. Thus, when a hot melt is utilized, the amount of plasticizer will be different from that required in, for example, an extrusion process.

In utilizing the plasticizers of the present invention, the desired amount of plasticizer is mixed with the resin by any of the methods known to the prior art, for example, compounding on a hot two-roll plastics mill, extension, calendering, dispersion techniques and subsequent coating, or molding.

The plasticizers of the present invention may be prepared by, for example, esterification of a trifunctional aromatic carboxylic acid or anhydride with a glycol and aliphatic alcohol. The esterifications may be carried out stepwise or in a single step. The mole ratio of aromatic acid to glycol should be as close to 2 as possible, and is preferably from 1.9 to 2.1 in order to prevent the formation of long chain polymeric materials which would result in a high viscosity product. However, the ratio depends upon the alcohol and glycol utilized as well as the equipment employed and the conditions of esterification.

The composition may be prepared by heating the three components (acid, glycol, and alcohol) together while distilling off the by-product water or by staged reaction of the acid with the glycol followed by reaction with the aliphatic alcohol. Particularly good results are obtained by employing an excess of aliphatic alcohol to effect complete reaction to a low acid number, which is preferably adjusted to a value below 5. The excess alcohol is then removed in the presence of a transesterification catalyst. Small amounts of the monomeric trialkyl esters are not detrimental, but it is preferable to keep the amount of the dialkyl hydroxyalkyl esters at a minimum. The following reactions are exemplary of the theoretical model of the present process. The letters have the same designations as above.

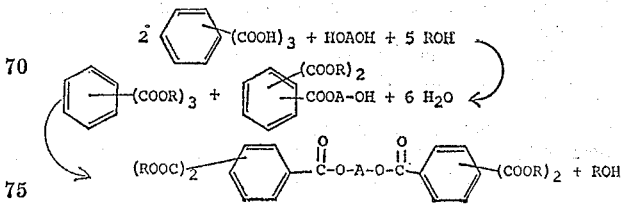

In the preferred process for the production of the present plasticizers, the tricarboxylic acid is in the anhydride form, and the glycol reacts with two anhydride molecules to produce the bis-ester linkage. In this case, to insure the preferential reaction of the glycol with the anhydride, it is usually necessary to utilize a di-primary glycol. The alcohol then reacts with the remaining acid groups to form the alkyl ester groups and the plasticizer of the present invention. This reaction may be carried out in either a single addition or plural additions, i.e. the alcohol and glycol may be mixed with the anhydride and reacted at one time, or the glycol reacted to produce the bis-ester linkage and then the alcohol added to complete the reaction. When the single addition reaction is effected, the mole ratio of anhyride to glycol is not as important as when the plural addition reaction is affected. Further, the single addition process is less expensive due to the ease of control, and lack of need for the additional equipment required in a plural addition process. However, when the single addition process is used, it is usually necessary to use a glycol that is shorter in carbon chain length than the alcohol in order to enhance the opening of the anhydride linkage and formation of the bis-ester. Moreover, where a primary alcohol is utilized it is usually necessary that a di-primary glycol be used to obtain the preferential anhydride opening.

Typical acids that can be employed are trimellitic acid or acid anhydride and trimesic acid.

The glycols and alcohols are selected so that the product ester is within the above definitions. Exemplary of the glycols that may be employed are ethylene glycol, propylene glycol, e.g., 1,2-propylene glycols; butylene glycol, e.g. 1,3 or 1,4-butylene glycol; hexamethylene glycol, e.g. the 1,6 glycol; decamethylene glycol, e.g. the 1,10 glycols; pentyl glycols, e.g. neopentyl; 2,2,4-trimethyl-1,3-pentanediol; hexanediols, e.g. cyclohexanediol; and 1,6-cyclohexanedimethanol and polyalkylene glycols such as polyethylene glycol, and polypropylene glycol. Typical alcohols that can be employed are butyl alcohols e.g. n or iso butyl; hexyl alcohols; octyl alcohols such as octyl, 2-ethyl hexyl or isooctyl alcohol; nonyl alcohols, such as nonyl and isononyl alcohol, decyl alcohols such as decyl and isodecyl alcohol; tridecyl alcohol and mixtures thereof.

Catalysts suitable for the transesterification reaction include zinc chloride, stannic chloride, stannous oxalate, zinc acetate, lead oxide, aluminum isopropylate, sodium aluminate and others.

However, other methods of preparation may be employed. For example, synthesis of the bis-ester by the reaction of alkyl halides with the alkali metal salts of the carboxylic acids or reaction of the carboxylic acid chlorides with the alcohols and glycols is acceptable.

The following examples are cited to exemplify the present invention, and not to limit the scope thereof.

EXAMPLE 1

(a) In a 2-liter flask is equipped with a thermometer, stirrer, inert atmosphere and Dean-Stark water trap, 384 grams (2 moles) of trimellitic anhydride and 62 grams (1 mole) of ethylene glycol are introduced. After heating to 180° C. under an inert atmosphere for one hour, 715 grams (5.5 moles) of 2-ethylhexanol are added and the reaction mixture heated to reflux while collecting 77 grams of water in the Dean-Stark trap. Heating is continued to 225° C. until the acid number is less than 3.0. The reaction is then cooled to 180° C. 0.12 gram of zinc chlorides (72° Bé.) added and excess alcohol (170 grams) distilled off under vacuum.

The resulting pale yellow oil has a viscosity of 1420 cps. at 25° C., an acid number of 1.0, a hydroxyl number of 1.4, and a molecular weight of 850±10 [theoretical molecular weight for ethylene bis(di-2-ethylhexyl trimellitate) is 894].

(b) A similar product is obtained when all of the reactants are charged to the flask initially. The pale yellow oil has a viscosity of 1140 cps. at 25° C., an acid number of 1.5, low hydroxyl content, and a molecular weight of 720±18.

EXAMPLE 2

Trimellitic anhydride (384.2 grams), ethylene glycol (62.1 grams), and isodecyl alcohol (869 grams) are heated to reflux while distilling off 78 grams of water. Heating is continued at 200° to 225° C. until the acid number is less than 3. Zinc chloride (0.12 gram, 72° Bé.) is added, and the excess isodecyl alcohol removed under vacuum. A total of 206 grams of the theoretical 237 grams of excess isodecyl alcohol are recovered. The resulting pale yellow oil has a viscosity of 1400 cps., an acid number of 0.83 and low hydroxyl content.

EXAMPLE 3

In manner similar to Example 2 ethylene bis(dibutyl trimellitate) is prepared. The light oily product has a viscosity of 2500 cps. at 25° C., an acid number of 2.0, and a molecular weight of 634±10 [theoretical molecular weight for ethylene bis(dibutyl trimellitate) is 670].

EXAMPLE 4

Trimellitic anhydride (384 grams), 1,2-propylene glycol (76 grams), and 2-ethylhexanol (715 grams) are heated to reflux while distilling off 85 grams of water. Heating is continued at 225° C. until the acid number is less than 3. The reaction medium is then cooled at 180° C., zinc chloride (0.12 gram) added and the excess 2-ethylhexanol removed under vacuum. The resultant pale yellow oil has an acid number of 2.7, low hydroxyl content, and a viscosity of 800 cps. at 25° C.

EXAMPLE 5

Critical tests for the amount of volatile material in a compound are the automotive fogging tests. The Fisher Body Division of General Motors Corp. Test No. 46–3, revised 2/67 and conducted at 195° F., is utilized for the present tests. The performance of the alkylene bis-dialkyl trimellitate ester is shown in Table I.

TABLE 1

Fisher Body Fog Test No. 46–3, temp. 195° F.

| Plasticizer:[1] | Percent reflectance[5] at 60° |
|---|---|
| Material from Example 1a[2] | 91 |
| Monomeric ester[3] | 70 |
| Polyester[4] | 60 |
| Unfogged glass plate control | 93 |

[1] See the following table:

|  | Grams |
|---|---|
| PVC | 100 |
| Plasticizer | 80 |
| Ba/Cd laurate | 2 |

[2] Ethylene bis (di-2-ethyl hexyl trimellitate).
[3] Tri-2-ethylhexyl trimellitate.
[4] Glycol-adipic, fatty acid terminated polyester, MW ca. 3300.
[5] 100% reflection is indicative of no fogging, test values above about 90% indicate no fogging visible to the naked eye.

EXAMPLE 6

Higher molecular weight monomeric plasticizers (MW range approx. 500–590) that have low volatility and excellent resistance to extraction by soapy water are available. These materials are generally poor for resistance to extraction by hydrocarbons and migrate readily into contacting media such as foam rubber and polystyrene. Polyester plasticizers, depending on their molecular weight, composition, and method of manufacture, have a generally better balance of permanence properties especially in hydrcarbon resistance and resistance to migration than those of previous high molecular weight monomeric plasticizers. Polyesters are, however, sensitive, to varying degrees, to hot, humid atmospheres, are generally of high viscosity, and are difficult to process. The unique combination of properties imparted by the alkylene bis-dialkyl trimellitates of the present invention is illustrated in Table II.

idues. The products, however, do not sacrifice any of the electrical and extraction characteristics of the PVC homopolymer compositions. That is, the volume resistivity and

TABLE II

| Plasticizer [6] | Material of Example 1a [2] | TOTM [7] | Polyester [8] | Polyester [4] |
|---|---|---|---|---|
| Viscosity, Gardner-Holdt | X | G+ | K-L | Z3+. |
| Color, VCS | 2+ | 1– | 1– | 1–. |
| Hardness, Shore A, 10 sec | 83 | 77 | 75 | 79. |
| Tf, ° C. (Clash-Berg method) | –11 | –26 | –26 | –14. |
| Volatility, activated carbon, 24 hrs./90° C., percent loss | 0.5 | 0.7 | 1.3 | 0.8. |
| 1% soap solution, 24 hrs./90° C., percent loss | 0.4 | 0.7 | 01.8 | 1.0. |
| Extraction by n-hexane, 2 hrs./23° C., percent loss | 18.4 | 32.2 | 14.2 | 2.8. |
| Extraction by mineral oil, 10 days/23° C., percent loss | 0.7 | 18.4 | 9.8 | 2.3. |
| Migration into foam rubber, 7 days/60° C./¼ p.s.i., percent loss | 4.2 | 10.5 | 8.3 | 1.3. |
| Marring of polystyrene, 48 hrs./70° C./0.5 p.s.i. | Very slight | Definite+ | Definite | Trace. |
| High humidity spew, 60° C | None in 115 days | Slight in 46 days | Definite in 30 days | Definite in 60 days. |

[2,4] See footnotes at bottom of Table I.
[6] 100 g. PVC; 67 g. plasticizer; 1.7 g. Ba/Cd laurate.
[7] Trioctyl trimellitate.
[8] Glycol-adipic polyester, MW ca. 1,050.

EXAMPLE 7

Insulation for electrical wires and insulating tapes frequently are required to maintain their elongation and electrical resistance properties after various aging periods at high temperatures. Currently, the most severe commercial test for certification for use at 105° C. Electrical and physical properties showing the unique combination of high performance in insulation compounds coupled with the excellent permanence demonstrated in Example 6 are shown in Table III.

TABLE III

| Plasticizer [9] | Material of Example 1a [2] | TOTM [7] | Polyester [4] |
|---|---|---|---|
| Amount of plasticizer | 55 | 55 | 55 |
| Shore C Hardness, 10 secs | 59 | 61 | 65 |
| Volume resistivity, ohm cms.×10⁻¹²: | | | |
| 90° C., dry | 0.20 | 0.95 | 0.06 |
| 60° C., wet | 1.93 | 1.13 | 0.13 |
| After immersion in deionized water at 75° C. for— | | | |
| 1 day | 0.55 | 0.39 | 0.02 |
| 1 week | 0.65 | 0.48 | 0.01 |
| 1 month | 0.55 | 0.30 | 0.003 |
| High temperature aging (UL 105° C. rated insulation): | | | |
| Original: | | | |
| Tensile strength, p.s.i. | 2,900 | 2,800 | 2,800 |
| Elongation, percent | 350 | 340 | 295 |
| Percent retention after 7 days at 136° C.: | | | |
| Tensile strength, p.s.i. | 104 | 107 | 110 |
| Elongation, percent | 92 | 85 | 109 |

[2,4] See footnotes at end of Table I.
[7] See footnotes at end of Table II.
[9] 100 g. PVC; X g. plasticizer, as indicated; 10 g. dythal; 5 g. No. 33 clay; 0.5 g. paraffin wax; 0.5% Bisphenol A based on plasticizer content.

EXAMPLE 8

Prior art plasticizers comprising benzyl esters of glycol ester acids do not perform as plasticizers for PVC in that they yield hard, brittle compounds, whereas the plasticizers of this invention in combination with PVC yield tough, flexible compounds as illustrated in Table IV.

TABLE IV

| Plasticizer [6] | Alkyl bis-ester [10] | Aromatic ester [11] | Polyester [4] |
|---|---|---|---|
| Viscosity, TBR, secs | 8.5 | >200 | 46.0. |
| Shore A Hardness, 10 secs | 77 | >100 | 74. |
| Shore D Hardness, 10 secs | | 79 | |
| Tf, ° C. (Clash-Berg method) | –23.5 | +31 | –12. |
| Flexibility | Good | Very poor, brittle | Good. |
| Ease of processing at 25° F | do | Fair | Fair-good. |

[4] See footnotes at end of Table I.
[6] See footnotes at end of Table II.
[10] Ethylene bis(octyl-decyl trimellitate).
[11] Ethylene bis(di-benzyl trimellitate).

EXAMPLE 9

When tests are run in accordance with the above examples and copolymers of vinyl chloride and vinyl acetate substituted for the PVC, the resultant compositions are slightly softer. These copolymers have 2.5 and 5% vinyl acetate residues, the remaining being vinyl chloride residues. The products, however, do not sacrifice any of the electrical and extraction characteristics of the PVC homopolymer compositions. That is, the volume resistivity and losses due to extraction are essentially the same as those of the PVC compositions above.

The above conditions are also observed when tests are run utilizing copolymers of 97.5% vinyl chloride and 2.5% vinylidene chloride.

EXAMPLE 10

In further examples, the bis-esters are prepared by reacting one mole polyethylene glycol, with two moles of trimellitic acid, followed by reacting the bis-ester product thereof, with four moles of n-butanol to form a plasticizer of the present invention. This product functions well as a plasticizer in PVC compositions.

It is claimed:

1. A composition comprising a vinyl chloride polymer and an effective plasticizing amount of a compound having the formula:

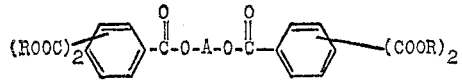

wherein R is alkyl of from 4 to 13 carbon atoms and A is an alkylene or cycloalkylene radical having 2 to 10 carbon atoms or a polyalkylene radical having 4 to 8 carbon atoms.

2. The composition of claim 1 wherein at least one of these alkyl ester groups is next adjacent to the bis-ester linkage or the aromatic ring.

3. The composition of claim 1 wherein said compound is present in an amount of from 1 to 600 parts per 100 parts of said polymer.

4. The composition of claim 3 wherein said compound is present in an amount of from 20 to 100 parts per 100 parts of said polymer.

5. The composition of claim 1 wherein said compound is ethylene bis(dibutyl trimellitate).

6. The composition of claim 1 wherein said R has from 6 to 10 carbon atoms, and said A, when an alkylene or alicyclic glycol, has from 2 to 5 carbon atoms, and, when a polyalkylene ether glycol, has from 4 to 6 carbon atoms.

7. The composition of claim 6 wherein the compound of class 1 is selected from the group consisting of ethylene bis(di-2-ethyl hexyl trimellitate), ethylene bis(diisodecyl trimellitate), and ethylene bis(octyl-decyl trimellitate).

8. The composition of claim 1 wherein said polymer contains from 50 to 100% by weight vinyl chloride and from 0 to 50 percent of compounds selected from the group consisting of vinyl alkanoates and vinylidene chloride.

9. The composition of claim 8 wherein said polymer is from 85 to 100% vinyl chloride and 0 to 15% vinyl acetate.

10. The composition of claim 9 wherein said polymer is polyvinyl chloride.

11. A composition comprising a polymer of from 100 to 90% by weight vinyl chloride residues and from 0 to 10% by weight of residues selected from the group consisting of vinyl acetate, vinylidene chloride, ethyl acrylate and allyl acetate and from 20 to 100 parts per 100 parts of polymer of a compound having the formula:

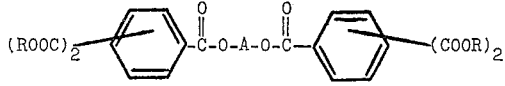

wherein R is an alkyl group of from 6 to 10 carbon atoms, and A is alkylene or cycloalkylene radical having 2 to 5 carbon atoms or a polyalkylene radical having 4 to 6 carbon atoms.

12. The composition of claim 11 where said polymer is vinyl chloride/vinyl acetate.

13. The composition of claim 11 wherein said compound is selected from the group wherein said R has from 6 to 10 carbon atoms, and said A, when an alkylene or alicyclic glycol, has from 2 to 5 carbon atoms, and, when a polyalkylene ether glycol, has from 4 to 6 carbon atoms.

14. The composition of claim 11 wherein at least one of the alkyl ester groups is next adjacent to the bis-ester linkage on the aromatic ring.

15. In an electrical insulating material comprising a vinyl chloride polymer, lubricant, stabilizer, filler, and plasticizer, the improvement wherein at least a part of said plasticizer is a compound having the formula

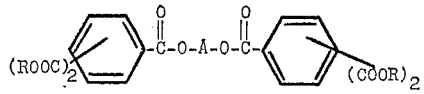

wherein R is an alkyl group of from 6 to 10 carbon atoms, and A is an alkylene or cycloalkylene radical having 2 to 5 carbon atoms or a polyalkylene radical having 4 to 6 carbon atoms.

16. The composition of claim 15 wherein said compound is selected from the group consisting of ethylene bis(di-2-ethyl hexyl trimellitate) and ethylene bis(octyldecyl trimellitate).

17. The composition of claim 15 wherein said filler is carbon black.

18. The composition of claim 17 wherein said carbon black is present in an amount of from 0.5 to 10 weight percent, based on the vinyl chloride polymer.

References Cited

UNITED STATES PATENTS

| | | | |
|---|---|---|---|
| 2,075,107 | 3/1937 | Frazier | 260—31.6 |
| 3,223,671 | 12/1965 | Kraft | 260—31.6 |
| 3,303,241 | 2/1967 | Moorshead | 260—475 P |
| 3,354,110 | 11/1967 | Horan | 260—31.8 |
| 3,379,669 | 4/1968 | Bargellini | 260—31.6 |

FOREIGN PATENTS

| | | |
|---|---|---|
| 1,012,003 | 12/1965 | Great Britain. |
| 1,072,695 | 6/1967 | Great Britain. |

MORRIS LIEBMAN, Primary Examiner

P. R. MICHL, Assistant Examiner

U.S. Cl. X.R.

260—31.4 R, 475 P